United States Patent [19]

Stangroom

[11] 3,975,552

[45] Aug. 17, 1976

[54] METHOD OF BAKING A PIZZA USING MICRO-WAVE ENERGY

[75] Inventor: Max Stangroom, Houston, Tex.

[73] Assignee: National Convenience Stores, Houston, Tex.

[22] Filed: Mar. 31, 1975

[21] Appl. No.: 563,690

[52] U.S. Cl. .............................. 426/243; 426/296; 426/458

[51] Int. Cl.² ........................................... A21D 6/00

[58] Field of Search ............ 426/242, 243, 89, 104, 426/523, 549, 557, 289, 292, 296, 497, 496, 458, 465

[56] References Cited

UNITED STATES PATENTS

| | | | |
|---|---|---|---|
| 3,479,188 | 11/1969 | Thelen | 426/243 |
| 3,615,679 | 10/1971 | Tangel | 426/551 |
| 3,718,480 | 2/1973 | Tremblay | 426/242 |
| 3,908,029 | 9/1975 | Fredrickson | 426/242 |

*Primary Examiner*—Hiram H. Bernstein
*Attorney, Agent, or Firm*—Arnold, White & Durkee

[57] ABSTRACT

A pizza capable of being baked using micro-wave energy, i.e., in a micro-wave oven, while remaining crisp is prepared from a dough comprising:

- i. from about 75 percent to about 82 percent by weight flour, preferably a medium to weak strength bleached, low gluten flour;
- ii. up to about 5 percent by weight shortening, animal or vegetable shortening; and
- iii. from about 18 percent to about 25 percent by weight moisture.

In preparing the pizza, a dough of the above composition is shaped into the shape of a pizza crust and thereafter dried in a convection or micro-wave oven to a moisture content of from about 3 percent to about 8 percent by weight. After the addition of pizza toppings, i.e., sauce and cheese and any additional ingredients, to the dried crust, the dried crust and pizza toppings can be baked in a micro-wave oven using micro-wave energy, the crust remaining crisp throughout the baking.

The pizza can be baked in the micro-wave oven either packaged or unpackaged and can be baked either frozen or unfrozen.

5 Claims, No Drawings

METHOD OF BAKING A PIZZA USING MICRO-WAVE ENERGY

BACKGROUND OF THE INVENTION

1. Field of the Invention

The present invention is directed to a method of preparing a pizza, a pizza produced from a specified dough and a pizza crust; more particularly the present invention relates to such method, pizza dough and crust wherein the pizza is capable of being baked using micro-wave energy, i.e., in a micro-wave oven, with the pizza crust remaining crisp throughout the baking.

2. Description of the Prior Art

Pizzas are typically prepared by including a layer of sauce, principally a tomato and tomato paste sauce and a sprinkling of cheese onto a dough or crust, the pizza being baked in an oven for a period of about 10 to 15 minutes. This time is required for the pizza to bake totally through and to provide a crust which is thoroughly baked, generally to a crisp texture.

Pizzas prepared for homebaking, as opposed to restaurant or carry-out shop baking generally require even longer periods of preparation. Generally, the pizzas available for household preparation are frozen pizzas having essentially the same ingredients as described above in an appropriate wrapping or package. These frozen pizzas are generally stored in a freezer until use. To bake these pizzas, the oven must be preheated to the desirable temperature over a substantial period of time, i.e., generally 30 to 45 minutes after which the consumer can bake the frozen pizza in the oven. Again, from about 10 to 15 minutes is required in this baking operation. Accordingly, in the home, from the time of the initial decision to prepare pizza to the final placing of the pizza on the table to be eaten, 45 minutes to an hour or longer can be consumed.

This time problem has not gone unrecognized. For example, U.S. Pat. Nos. 3,615,678 and 3,615,679 in the name of Frank P. Tangel, describe an attempt at a solution to this problem by providing a frozen pizza which may be baked to completion in an ordinary toaster. The pizza which is described comprises first and second partially cooked dough layers of approximately the same size and shape, sealed together at their edges to provide a pocket between them within their edges. This pocket is filled with a sauce made essentially from tomato base and cheese, the weight of the filling being approximately 40 to 60 percent of the total weight of the pizza.

The pizza is described as rigid in its frozen state. Within the toaster, both pizza dough layers as well as the pizza filling are heated with the heating completing the baking of the pizza. This baking causes the pizza dough to change to a brown pleasing appearance and a fully cooked taste, reducing the rigidity of the dough to a semi-soft and chewable quality.

While this frozen pizza which can be baked to completion in an ordinary toaster does solve the time problem described above, this pizza is not the answer. Not only does the pizza fail to look like the ordinary restaurant or carry-out shop pizza, but, in order to make a pizza which can be baked to completion in a toaster, ordinary pizza taste is sacrificed. This, coupled with the undesirable texture of the crust which is obtained in the toaster baking makes this frozen pizza product a very unsatisfactory consumer item.

Cooking or baking with micro-wave energy, such as in a micro-wave oven, has started to replace conventional convection oven cooking or baking both on the restaurant level and in the home. The advantages of micro-wave cooking or baking are many, foremost of which are the increased speed of cooking and the versatility of cooking which allows cooking of packaged products. Accordingly, restaurants, fast food establishments, convenience stores, etc., employ micro-wave cooking as a replacement for conventional ovens. Similarly, in the home, micro-wave ovens are being employed to a great extent to supplement or replace conventional ovens.

The use of micro-wave ovens for baking and the advantages of micro-wave energy baking are described, for example, in U.S. Pat. No. 3,718,480 in the names of Maurice Robert Tremblay and Richard Launt Moore. In accordance with this patent, a wheat flour pasta is prepared from a dough which is shaped into individual pasta pieces. The pieces are predried to a moisture content between 22 and 27 percent by using warm dry air and then dried to between 8 and 13 percent moisture by the application of micro-wave energy. The use of the micro-wave energy is said to materially reduce the overall drying time and produce a pasta with a shortened rehydrating time and less microbiological build-up.

The application of micro-wave energy cooking to pizza preparation would substantially reduce the baking time of pizzas and eliminate the problems described above. Unfortunately, prior to the development of the present invention, pizzas could not be successfully baked using micro-wave energy, since the pizza crust could not be maintained in a crisp state; rather, in all previous attempts to produce a pizza which could be baked using micro-wave energy the crust of the pizza became soggy and the entire product failed to have the characteristic pizza appearance and taste. All of these problems have been overcome in acccordance with the present invention whereby a pizza has been provided which can be effectively and efficiently baked using micro-wave energy, the pizza crust remaining crisp and the product having the taste and appearance of pizzas cooked in conventional convection ovens.

SUMMARY OF THE INVENTION

The present invention provides an improvement over conventional pizzas and methods of preparing such pizzas by providing a pizza which can be effectively and efficiently baked using micro-wave energy, with the pizza crust remaining crisp throughout the baking. Such pizza has the appearance and taste of a pizza which is prepared using a conventional convection oven. The ability to bake the pizza of the present invention using micro-wave energy creates numerous advantages, including a much shortened baking time and the ability to bake the pizza while packaged and in a frozen or unfrozen condition. This makes the pizza of the present invention particularly attractive for fast food establishments, convenience stores, and for home preparation where shortened baking time is a tremendous advantage.

The above advantages of the present invention are achieved through the provision of a method of preparing a pizza and a pizza so produced wherein the method comprises:

a. Preparing a pizza dough comprising:

i. from about 75 percent to about 82 percent by weight of flour, preferably a medium to weak bleach, low gluten flour;
ii. up to about 5 percent by weight shortening, an animal or vegetable shortening; and
iii. from about 18 to about 25 percent by weight moisture;

b. shaping the dough into the shape of a pizza crust;
c. drying the pizza crust in a conventional convection oven or micro-wave oven to form a dried crust of a moisture content of from about 3 to about 8 percent by weight;
d. topping the dried crust with pizza toppings, i.e., a tomato sauce and cheese and any additional meat, fish, or vegetable toppings; and
e. baking the crust and pizza topping using micro-wave energy, the crust remaining crisp throughout the baking.

The present invention also provides a pizza capable of remaining crisp when baked in a micro-wave oven wherein the pizza comprises edible pizza toppings on a partially dehydrated crust prepared by drying to a moisture of from about 3 to about 8 percent by weight of dough of the above composition. Furthermore, the present invention relates to a pizza crust capable of being baked in a micro-wave oven with pizza toppings and remaining crisp, the pizza crust being formed of a shaped dough comprising the above composition, the dough being dried to a moisture content of from about 3 percent to about 8 percent by weight prior to addition of pizza toppings and micro-wave energy baking.

It is essential in accordance with the present invention that the dough utilized to prepare the pizza crust have a low shortening content, e.g., a shortening content up to about 5 percent by weight, preferably a shortening content of from about 1 to about 3 percent by weight. Generally, the amount of shortening utilized is just sufficient to maintain a doughy consistency and prevent the dough from being sufficiently friable as to fall apart. Furthermore, it is essential in accordance with the present invention that the pizza crust made of the above described dough be preliminarily dried or partially dehydrated to a minimum moisture content e.g., of from about 3 percent to about 8 percent, from its initial higher moisture content. It is the low shortening content and this moisture content which at least in part effectively allows the pizza and pizza crust of the present invention to remain crisp during micro-wave baking. The moisture content of the pizza toppings, particularly in the tomato base sauce prevent the crust from being totally dehydrated during micro-wave energy baking. Accordingly, the pizza and method of the present invention provide a product which has all of the advantages of pizzas produced by conventional convection oven baking, including taste and appearance, with the additional advantages of micro-wave energy baking, particularly shortened baking time.

Accordingly, it is a principal feature of the present invention to provide a method of preparing a pizza wherein the pizza crust and toppings are baked using micro-wave energy, with the crust remaining crisp throughout the baking, thereby eliminating problems inherent in the production of pizzas through micro-wave energy baking.

It is a further feature of the present invention to provide a pizza crust capable of being baked in a micro-wave oven with pizza toppings and remaining crisp throughout, said pizza crust being prepared from a dough which includes a minimum shortening content and which is predried or partially dehydrated to a minimum moisture content prior to micro-wave energy baking.

Yet a further feature of the present invention resides in a pizza capable of remaining crisp when baked in a micro-wave oven, the pizza comprising edible pizza toppings on a partially dehydrated crust prepared by drying to a moisture content of from about 3 to about 8 percent by weight a crust formed from a dough having a minimum shortening content.

It is still a further feature of the present invention to provide such method of preparing pizza, pizza crust and pizza prepared by such method wherein the dough employed in preparing the pizza crust comprises from about 75 to about 82 percent by weight flour, up to about 5 percent by weight shortening and from about 18 to about 25 percent by weight moisture, the dough in the form of a pizza crust being predried or partially dehydrated to a moisture content of from about 3 percent to about 8 percent by weight prior to the application of pizza toppings and micro-wave energy baking.

Still further features and advantages of the method of preparing pizza, pizza crust and pizza prepared by such method in accordance with the present invention will become more apparent from the following more detailed description of the present invention.

DESCRIPTION OF THE PREFERRED EMBODIMENTS

The pizza of the present invention is prepared from a dough which is characterized by having a low shortening content and further characterized by a predrying of the dough or partial dehydration of the dough to a low moisture content prior to the addition of pizza toppings and baking of the pizza using micro-wave energy. The low shortening content of the dough and the predrying or partial dehydration prior to micro-wave energy baking are essential parameters which allow the pizza of the present invention to be baked using micro-wave energy, with the pizza crust remaining crisp throughout the baking. This, therefore, eliminates the problems associated with previous attempts to provide a pizza which could be baked by micro-wave energy and allows for the advantages of increased baking speed and versatility.

In accordance with the present invention, the dough from which the pizza crust is prepared generally comprises the following:
i. from about 75 percent to about 82 percent by weight flour;
ii. up to about 5 percent by weight shortening; and
iii. from about 18 to about 25 percent by weight moisture.

In addition, the dough can contain minor amounts of other components, including, for example, up to about 2 percent by weight baking powder and up to 1 percent by weight salt. Also, the dough can contain very small amounts of the typical spices which are employed in pizza doughs. Generally, the dough from which the pizza of the present invention is prepared contains no yeast or other levening material.

The type of flour employed in preparing the pizza dough is not critical to the present invention. Any conventional flour used in preparing pizza and similar doughs can be utilized. For the purposes of the present invention it is preferred to utilize a medium to weak strength bleached, low gluten flour. Again however, the present invention cannot be limited to the above and the nature of the flour does not in any way affect the method of the present invention, whereby a pizza with a crisp crust is prepared using micro-wave energy.

While the amount of flour employed in the dough is variable, it has been generally found in accordance with the present invention that an amount of flour of from about 75 to about 82 percent by weight produces advantageous results, with the most preferred amount of flour being from about 75 percent to about 80 percent by weight. Within this weight range, a dough of the proper consistency for preparation of a pizza crust is obtained. It should be recognized, however, that where desirable for particular purposes, lesser and greater amounts of flour can be utilized in preparing the pizza dough.

The nature of the shortening utilized in the pizza dough of the present invention is quite variable and any conventional animal or vegetable shortening can be utilized. Preferably, the shortening employed is a typical vegetable shortening such as those prepared from soy bean oil, corn oil, cottonseed oil, safflower oil, etc., in hydrogenated and partially hydrogenated forms, including commercial mixtures of these. A preferred type of animal shortening which can be advantageously utilized is lard. As employed throughout, the expression shortening is meant to embrace both liquid oils as well as semi-solid and solid shortenings prepared from such oils. Any of these can be advantageously utilized in the present invention.

An important feature of the present invention resides in the fact that the shortening is employed in a minor amount within the pizza dough, this amount being functionally stated as an amount not substantially in excess of that required to provide the dough with a doughy or dough-like consistency, i.e., not substantially in excess of that amount required to hold the dough together, without crumbling. Generally, this amount will be up to about 5 percent by weight shortening, with a most preferred amount in accordance with the present invention comprising from about 1 to about 3 percent by weight shortening based upon the total weight of the pizza dough. Here again, slightly lesser and greater amounts of shortening can be employed where desired for particular purposes, consistent with the purposes of the present invention to employ an amount of shortening not substantially in excess of that required to provide the pizza dough with a dough-like consistency.

The pizza dough of the present invention also contains moisture in an amount sufficient to form a dough of the proper consistency and texture for formation into the shape of a pizza crust. Generally the amount of moisture present in the initial pizza dough is from about 18 percent to about 25 percent by weight, preferably from about 18 percent to about 22 percent by weight. Here again, lesser or greater amounts of moisture can be initially present in the pizza dough since, an essential feature of the present invention resides in a predrying or partial dehydrating of the dough prior to addition of pizza toppings and final baking using micro-wave energy. Accordingly, the initial moisture content of the dough is variably over fairly broad limits, although operation within the above range appears to provide extremely effective results.

In accordance with the present invention, it has been determined that a particularly effective dough for use in preparing a pizza within the above parameters is a tortilla dough having amounts of flour, shortening and moisture within the above general limits. While a tortilla dough is generally not thought of as an effective dough for forming a pizza crust, particularly due to the lack of yeast or other leavening agent, it has been determined in accordance with the present invention that a tortilla dough meeting the above characteristics, and further dehydrated to a low moisture content prior to addition of pizza toppings and cooking, will remain crisp when baked in a micro-wave oven using micro-wave energy, Accordingly, in a preferred embodiment of the present invention, such tortilla dough falling within the above parameters is utilized as the pizza dough.

After the pizza dough is shaped into the shape of a pizza crust, by machine or by hand, it is essential in accordance with the present invention that the crust be predried or partially dehydrated to reduce the initial moisture content of the dough. Generally, the degree of partial dehydration or predrying is carried out to the extent that the dough is dried to a minimum moisture content, without substantial baking of the dough. In this regard, the dough should be predried or partially dehydrated to a minimum moisture content without any substantial change in appearance, i.e., without the formation of a dark color characteristic of baking of the dough. Generally, the final moisture content of the crust after this predrying or partial dehydration is from about 2 percent to about 8 percent by weight moisture, preferably from about 3.5 to about 6 percent by weight moisture. Here again, operation outside of this range can be tolerated in accordance with the present invention, consistent with obtaining a minimum moisture content for the particular dough used, without any substantial baking of the dough in this predrying or partial dehydration.

This partial dehydration or predrying of the dough can be carried out by any conventional means. For example, a conventional convection oven can be utilized. Also, micro-wave energy, as by the use of a micro-wave oven, can be utilized in this predrying or partial dehydration of the initial dough composition. Generally, when using a conventional convection oven a temperature of the order of 450° to 750°F is utilized. It should be apparent that the time of heating and the heating temperature can be easily controlled and corrolated based upon the final desired moisture content of the crust, i.e., a minimum moisture content without substantial baking of the crust.

After the partial dehydration or predrying of the crust, the crust is now ready for application of typical pizza toppings. This application of the pizza toppings can directly follow the partial dehydration or predrying or an unlimited period of time can pass between these steps. It might be convenient for some purposes to prepare the crust in one location with storage and/or freezing of the crust prior to application of the pizza toppings at the same or different location. The partially dehydrated or predried crust is extremely stable, with little change in texture and other properties over periods of prolonged storage, thereby rendering the method of the present invention extremely flexible.

The pizza toppings which are applied generally include a tomato base sauce and a sprinkling of cheeses. In addition, any other typically used meat, fish or vegetable topping can be added to the tomato sauce and cheese. A typical tomato sauce includes tomato, salt, spices, and cheese such as romano cheese. A typical cheese topping includes skimmed milk mozzarella, provalona, romano cheese, parmasean and whole milk mozzarella. These cheeses in combination or any one or more of these cheeses is typically employed as the cheese topping for pizza production. Again, one of the advantages of the present invention is that while the pizza is prepared using micro-wave energy, the same ingredients which are typically used in preparation of pizzas using conventional convection ovens can be utilized. The pizza which is produced by the method of the present invention therefore has the same texture, taste and appearance as pizzas prepared through conventionally employed techniques in restaurants and like establishments.

After application of the pizza toppings, the pizza can be frozen if desired and can be packaged in a form for use in a micro-wave oven. In order to prepare the pizza for consumption it is merely necessary to bake the pizza using the micro-wave oven. As previously noted, the pizza and method of the present invention are particularly characterized by the fact that the crust of the pizza remains crisp throughout this micro-wave baking, thereby distinguishing this pizza from all those previously proposed.

It has long been known that micro-waves of certain wave lengths are specifically absorbed by water molecules and their energy converted to heat. This concept has been applied to the cooking or baking of various products but has not been previously successfully applied to the baking of pizza due to the adverse effects of the micro-wave energy baking on the pizza crust. This has been totally eliminated in accordance with the present invention wherein the crust of the pizza remains crisp during micro-wave energy baking by adherence to the parameters above described.

The predrying or partial dehydration of the crust to a minimum moisture content prior to micro-wave energy baking in accordance with the present invention can be tolerated and is successful in at least in part developing a crust which remains crisp during micro-wave baking, due to the moisture content of the tomato sauce which is applied as a pizza topping. This moisture content is drawn out during the heating which is achieved during the micro-wave energy baking, thereby avoiding a burning or charring of the crust. As a result, a pizza is prepared which both in appearance and taste resembles a pizza which is prepared in a restaurant or like establishment using conventional convection ovens. The preparation in accordance with the present invention, however, has substantial advantages including a substantially shortened baking time and versatility and flexibility associated with in-package micro-wave energy baking.

The length of time of micro-wave energy baking is variable over wide limits, although, it can be said with surety that the micro-wave energy baking is substantially reduced timewise as compared to conventional convection oven baking. Variability in time, however, is based upon such things as the wattage of the micro-wave oven utilized, the density of the pizza toppings, including the moisture content of the pizza toppings, the placement of the pizza in the micro-wave oven and the nature of the container or box if used. Accordingly, it is difficult to generalize concerning the length of time of micro-wave energy baking, except to note that the baking using micro-wave energy should be carried out for a period of time sufficient to heat the pizza to the desired temperature for consumption without burning or charring of the pizza crust and topping. Using as an example a 1,000 watt 110 volt micro-wave oven, a baking time of approximately 45 to 90 seconds is applicable. This range is merely presented for illustration purposes only and depending upon the various factors above, can be shortened or lengthened to some extent. The prescribed baking time for any particular pizza can be easily determined by one familar with micro-wave energy baking.

It should be apparent that the particular type of micro-wave oven employed in carrying out the method of the present invention is not an essential parameter and any conventional micro-wave oven can be employed. Accordingly, the method of the present invention is applicable to those types of micro-wave ovens which are sold for household use as well as those micro-wave ovens which are commercially utilized in restaurants, fast food establishments, convenience stores, snack bars, etc. The shortened baking time for the pizza of the present invention coupled with the ability to bake the pizza when packaged and/or frozen, allows the preparation of pizza in an extremely short period of time, where insufficient time would be available to prepare and bake a pizza using a conventional convection oven.

While the present invention has been described primarily with regard to the above exemplification, it should be understood that the present invention cannot in any way be deemed limited thereto but rather must be construed as broadly as any and all equivalents thereof.

I claim:
1. A method of preparing a pizza which comprises:
   a. preparing a pizza dough comprising
      i. from about 75 percent to about 82 percent by weight flour;
      ii. up to about 5 percent by weight shortening; and
      iii. from about 18 percent to about 25 percent by weight moisture;
   b. shaping said dough into the shape of a pizza crust;
   c. drying said pizza crust to form a dried crust of a moisture content of from about 2 percent to about 8 percent by weight moisture;
   d. topping the dried crust with pizza toppings; and
   e. baking said crust and pizza toppings using micro-wave energy, said crust remaining crisp throughout the cooking.
2. The method of claim 1 wherein said flour is a medium to weak strength bleached, low gluten flour.
3. The method of claim 1 wherein said shortening is an animal or vegetable shortening.
4. The method of claim 1 wherein said pizza dough comprises:
   i. from about 75 percent to about 80 percent be weight flour;
   ii. from about 1 percent to about 3 percent by weight shortening; and
   iii. from about 18 percent to about 22 percent by weight moisture.
5. The method of claim 1 wherein in step (c) the pizza crust is dried in a moisture content of from about 3.5 to about 6 percent by weight.

* * * * *